United States Patent

Pearl, II et al.

(10) Patent No.: US 6,471,114 B2
(45) Date of Patent: Oct. 29, 2002

(54) MULTIPLE FLAME TORCH TIP AND METHOD

(75) Inventors: David S. Pearl, II, Fort Lauderdale, FL (US); David A. Foster, Plantation, FL (US); Frank G. Smith, Davie, FL (US)

(73) Assignee: Uniweld Products, Inc., Fort Lauderdale, FL (US)

( * ) Notice: Subject to any disclaimer, the term of this patent is extended or adjusted under 35 U.S.C. 154(b) by 0 days.

(21) Appl. No.: 10/037,249

(22) Filed: Nov. 7, 2001

(65) Prior Publication Data

US 2002/0058222 A1 May 16, 2002

Related U.S. Application Data

(62) Division of application No. 09/217,277, filed on Dec. 21, 1998, now abandoned.

(51) Int. Cl.[7] .......................... B23K 31/02; B23K 1/018
(52) U.S. Cl. ....................... 228/178; 228/245; 228/264; 126/237
(58) Field of Search ................................ 228/DIG. 902, 228/178, 218, 51, 196, 264, 245, 254, 248.1; 126/237, 405, 406; 431/127, 354; 239/543, 565

(56) References Cited

U.S. PATENT DOCUMENTS

| 316,785 | A | * | 4/1885 | Hoeveler et al. | |
|---|---|---|---|---|---|
| 995,017 | A | * | 6/1911 | Keevvil | 431/345 |
| 1,014,247 | A | * | 1/1912 | Moore | |
| 1,293,669 | A | * | 2/1919 | Barbert | |
| 1,499,202 | A | * | 6/1924 | Coutu | 126/25 B |
| 1,590,195 | A | * | 6/1926 | Kerr | |
| 1,613,611 | A | * | 1/1927 | Kerr | |
| 1,676,564 | A | * | 7/1928 | Lausen | |
| 2,378,001 | A | * | 6/1945 | Drummond | |
| 2,487,959 | A | * | 11/1949 | Zink | 239/565 |
| 2,571,537 | A | * | 10/1951 | Cartun | |
| 2,593,295 | A | * | 4/1952 | Granfield | 431/345 |
| 3,279,701 | A | * | 10/1966 | Falk et al. | 239/413 |
| 3,816,065 | A | * | 6/1974 | Marietta | 239/565 |
| 4,050,239 | A | * | 9/1977 | Kappler et al. | 60/39.511 |
| 4,191,333 | A | * | 3/1980 | Rene | 239/543 |
| 4,491,716 | A | * | 1/1985 | LaForce | 219/101 |
| 5,178,535 | A | * | 1/1993 | Delalle | 432/225 |
| 5,216,981 | A | * | 6/1993 | Solomon et al. | 122/367.3 |
| 5,755,568 | A | * | 5/1998 | Buhler | 431/344 |
| 5,979,741 | A | * | 11/1999 | Iguchi | 228/234.1 |

FOREIGN PATENT DOCUMENTS

| CH | 182671 | * | 6/1936 | 239/565 |
|---|---|---|---|---|
| FR | 1078578 | * | 11/1954 | |
| JP | 59-97784 | * | 6/1984 | 431/345 |
| JP | 0167622 | * | 9/1984 | 431/345 |
| JP | 63-248570 | * | 10/1988 | 431/345 |
| JP | 402253504 A | * | 10/1990 | |
| JP | 4-126910 | * | 4/1992 | 431/345 |
| JP | 7-156995 | * | 6/1995 | 431/345 |
| JP | 9-280519 | * | 10/1997 | 431/345 |
| JP | 2000280079 A | * | 10/2000 | |

OTHER PUBLICATIONS

US 2002/0058222A1 Pearl, II et al. (May 16, 2002).*
US 2001/0041318A1 Pearl, II et al. (Nov. 15, 2001).*
Uniweld Catalog dated 1969 (3–pages).*
AGF Incorporated Article "Flame Treating: The Best Choice"; (Burners for Flame Treating Plastics)(6–Pages) (No date available).*

* cited by examiner

Primary Examiner—Tom Dunn
Assistant Examiner—Kiley Stoner
(74) Attorney, Agent, or Firm—Nields & Lemack

(57) ABSTRACT

Torch tip for a torch, the tip adapted to be in fluid communication with a fuel gas and oxygen source for generating a flame, the torch tip including a tubular or substantially tubular body having a plurality of flame emitting spaced orifices, wherein the tubular body preferably is substantially U-shaped and includes a pair of spaced substantially parallel elongated legs. The torch tip can be used to simultaneously heat a plurality of closely spaced pipes for ease of removal or attachment to an object such as a reversing valve.

6 Claims, 3 Drawing Sheets

MULTIPLE FLAME TORCH TIP AND METHOD

This application is a Divisional of Ser. No. 09/217,277 filed on Dec. 21, 1998 now abandoned.

BACKGROUND OF THE INVENTION

The present invention relates to a torch, and in particular to a torch tip, designed for easy heating, brazing and soldering around tubular objects such as pipes, and particularly a plurality of pipes simultaneously.

U.S. Pat. No. 4,191,333, the disclosure of which is incorporated herein by reference, discloses a hook-like flame tip including an arcuate body extending for a full half-circle with a short straight section with its distal end closed by a cap, and an angular rear terminal threaded for engagement with a conventional coupling connecting the flame tip to a conventional torch. The arcuate body includes a plurality of spaced radial flame apertures which direct flame jets to the object being heated, brazed or soldered, for example.

Similarly, U.S. Pat. No. 5,755,568 discloses a multiflame torch tip including an elongated tubular handle or housing that mounts to a torch, a tubular stem, and a tip head joined to the tip stem, the tip head being arcuately curved through an angle of at least 240° and having two opposed closed terminal ends. The tip head includes a plurality of spaced outlet orifices which direct flame jets to the object being acted upon.

Neither of these devices, however, is configured to attach or remove more than one pipe at a time. For instance, in a heat pump air conditioning system, a reversing or reciprocal valve can have a plurality of pipes, conduits or tubing connected thereto. Since the location of the reversing valve generally provides very little space in which to work, and since the plurality of pipes are spaced close together, it is virtually impossible to remove the pipes by liquefying the solder using conventional equipment. Indeed, often one or more of the pipes is removed by sawing, thereby requiring a time-consuming retrofit operation to reattach them.

It is therefore an object of the present invention to provide a torch including a multiflame torch tip that can simultaneously remove or attach a plurality of pipes by heating, soldering, brazing or welding.

It is a further object of the present invention to provide a torch tip that exhibits improved flame stability and flame direction accuracy.

SUMMARY OF THE INVENTION

The problems of the prior art have been overcome by the present invention, which provides a torch including a torch tip adapted to be in fluid communication with a fuel gas and oxygen source for generating a flame, the torch tip including a tubular or substantially tubular body having a plurality of spaced orifices therein, wherein the tubular body preferably is substantially U-shaped and includes a pair of spaced substantially parallel elongated legs. The plurality of spaced orifices are located on each leg and are configured to each emit a flame towards an object to heat the same. The present invention also relates to a method of simultaneously attaching or removing a plurality of pipes or the like from an object using the torch tip.

DETAILED DESCRIPTION OF THE INVENTION

Figure 1:
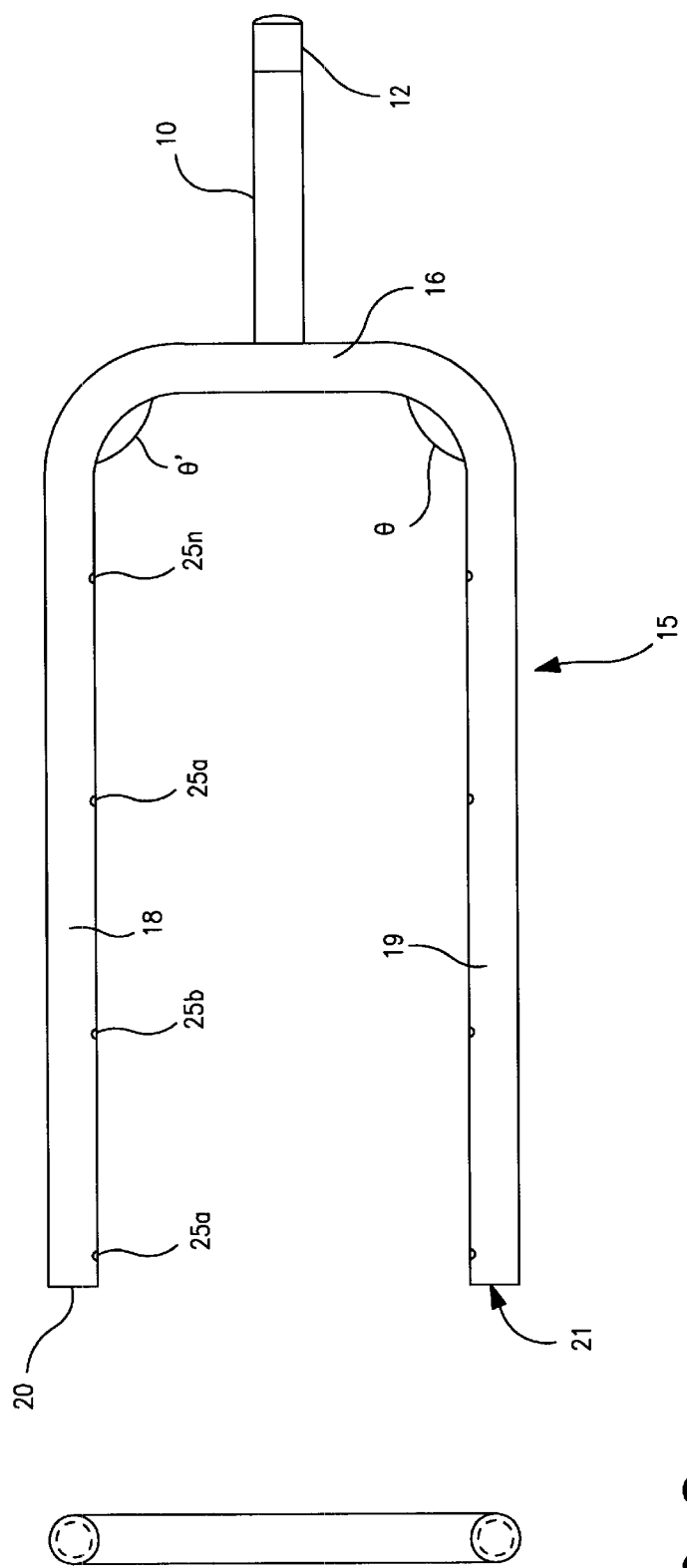
FIG. 1 is a cross-sectional view of a torch tip in accordance with the present invention.

Turning first to FIG. 1, torch tip 1 is shown having a substantially tubular shape in cross-section, including a longitudinal stem portion 10 having an inlet 12 adapted to be removably coupled to a torch by any suitable means, such as screw threads or a snap fit. Appropriate positioning of the tip stem portion 10 with respect to the torch member can be made prior to securing the tip stem on the torch member. The design of the torch member is not particularly limited, and can be conventional. In general, a torch member having an oxygen source passageway, a fuel gas (such as acetylene, MAPP or propane) passageway, and suitable valving for controlling the flow of oxygen and fuel gas is appropriate, such as that disclosed in U.S. Pat. No. 3,279,701, the disclosure of which is incorporated herein by reference. The tip stem 10 has an internal bore that is preferably uniform and circular in cross-section, to allow for smooth passage of the fuel gas and oxygen source mixture therethrough from the torch member to the tip head 15, which also has an internal bore that is preferably uniform and circular in cross-section. The torch tip is preferably constructed out of stainless steel tubing, ¼ inch in outer diameter with 0.035 inch thick walls.

Suitable fuel gases for use with the torch include acetylene, propane and MAPP. Suitable oxygen sources include pure oxygen and air.

The end of the stem portion 10 opposite the inlet 12 is in fluid communication with tip head 15, which is preferably U-shaped as shown. Those skilled in the art will appreciate that the stem portion 10 can be coupled to the tip head 15, or the stem portion 10 and tip head 15 can be a single integral piece. For ease of construction, it is preferred that the stem portion 10 be coupled to the tip head 15 by welding. It is preferred that the stem portion 10 be centrally located with respect to the tip head 15 to help ensure even gas flow distribution throughout the tip head 15.

In a preferred embodiment, the tip head 15 includes a lower inlet portion 16, which is preferably orthogonal relative to the stem 10. A pair of substantially parallel elongated legs 18, 19 extend from the inlet portion 16 as shown, each terminating in a respective closed end 20, 21. The ends 20, 21 can be closed by any suitable means, such as crimping or welding, with welding being preferred. The length of each leg 18, 19 is not particularly limited, and depends in part on the number and size of the tubing being worked upon. The length of each leg 18, 19 also determines the number and relative spacing of each flame orifice 25a–25n. In the embodiment shown, each leg is 4.75 inches long, measured from the point where the stem portion 10 meets the inlet portion 16 to the closed end 20 or 21.

Figure 2:
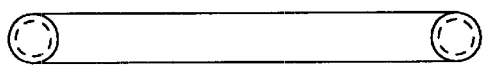
FIG. 2 is an end view of the torch tip of FIG. 1.
Figure 3:
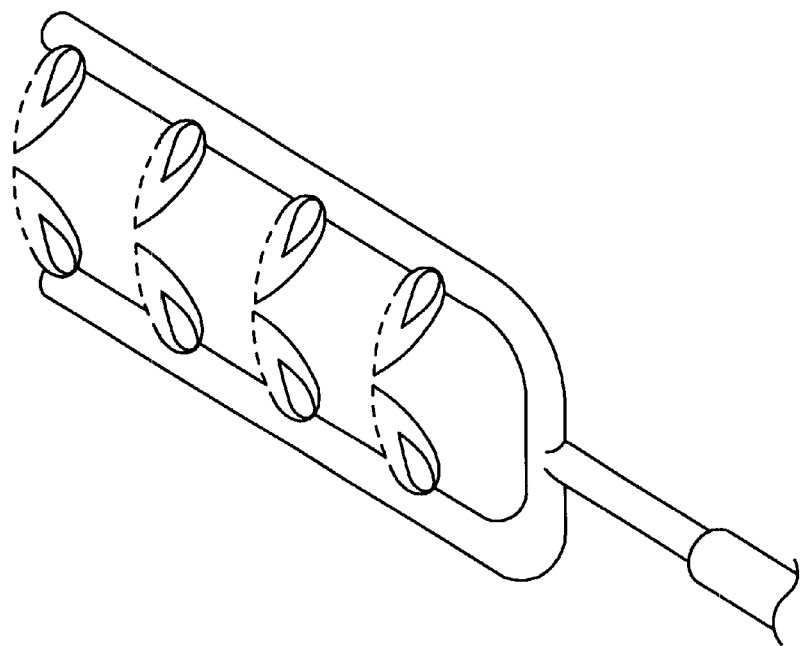
FIG. 3 is a perspective view of the torch tip in accordance with the present invention.

A plurality of orifices 25a–25n are formed on each leg and are preferably equally spaced. In the embodiment shown, the orifices are spaced 1.125 inches apart, with orifice 25a spaced from the closed end 20 a distance of 0.156 inches. Each orifice 25a–25n in leg 18 is preferably positioned opposite a corresponding orifice in leg 19. Each leg has four such orifices in the embodiment shown, although fewer or more could be used. As can be seen from FIGS. 1 and 2, the particular location of the orifices 25 is preferably offset at an angle from the bisecting plane of the tip head 15. A suitable offset angle, measured from the center of the orifice 25 to the bisecting plane, is from about 30° to about 60°, most preferably about 40°. So offsetting the location of the orifices 25 directs the flame jets emanating therefrom away from the cutting or bisecting plane of the leg and away from the opposite leg (FIG. 3), thereby reducing the chance of overheating of the torch tip. Those skilled in the art will appreciate that the foregoing is provided by way of illustration, and the size of the torch tip, the number of orifices, and the spacing between them are not particularly limited.

Figure 5:
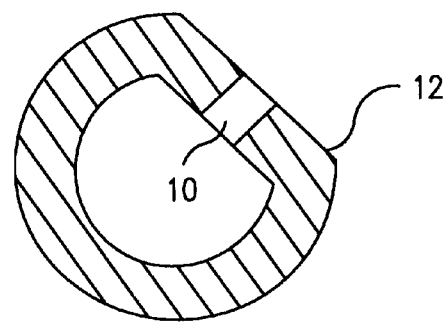
FIG. 5 is a cross-sectional view of another embodiment of the torch tip in accordance with the present invention.

In one embodiment of the present invention (FIG. 5), the curvature of the tip head 15 is reduced or eliminated (relative to a circular cross-section) at least in the proximity of the desired location of each of the orifices in order to optimize the roundness of each orifice. For example, a flat or planar indentation is formed in the outer peripheral surface of the tip head 15, such as by stamping, in each of the areas where the orifices are to be created. The size of each flat surface should be at least as large as the diameter of the respective orifice to be formed therein, and is preferably slightly larger. A suitable size for an orifice diameter of from about 22 to 32 mils is ⅛" square. By way of further illustration, the distance from the center of the bore of the tip head 15 to the flat surface 12 (which flat surface can be considered a chord of the circle formed by the tip head 15) is 0.070" for a tip head 15 having an outside diameter of ³⁄₁₆". The flat or planar surfaces allow for formation of a round or substantially round (in cross-section) orifice at an acute compound angle; drilling through a standard tube without such a planar surface results in the formation of an oval, rather than a round, orifice. Round orifices are preferred for flame stability. Where the fuel gas is acetylene, a suitable orifice diameter is 22±5 mils. Where the fuel gas is propane of MAPP, a suitable orifice diameter is 32±5 mils. Preferably each orifice is uniform in diameter throughout its length.

In an alternative embodiment, the curvature of the tip head 15 is reduced or eliminated in the desired areas by removing a portion of the wall thickness of the tip head 15, such as by cutting or machining.

In yet a further embodiment, the configuration of the tubular tip head 15 can be chosen (or formed) such that a portion of its outer periphery spaced from the bisecting plane is planar throughout its entire arcuate length, giving the tip head 15 a cross-section along its entire arcuate length as shown in FIG.

The distance between each leg 20, 21, defined by the length of the inlet portion 16 and the angles θ and θ', which are preferably equal, depends upon the diameter of the tubing being worked upon, as the space between each leg must be sufficient to accommodate that tubing. In the embodiment shown, the space between legs 18 and 19 is 1.75 inches, although those skilled in the art will appreciate that smaller or larger spacing can be used depending upon the application.

Figure 4:
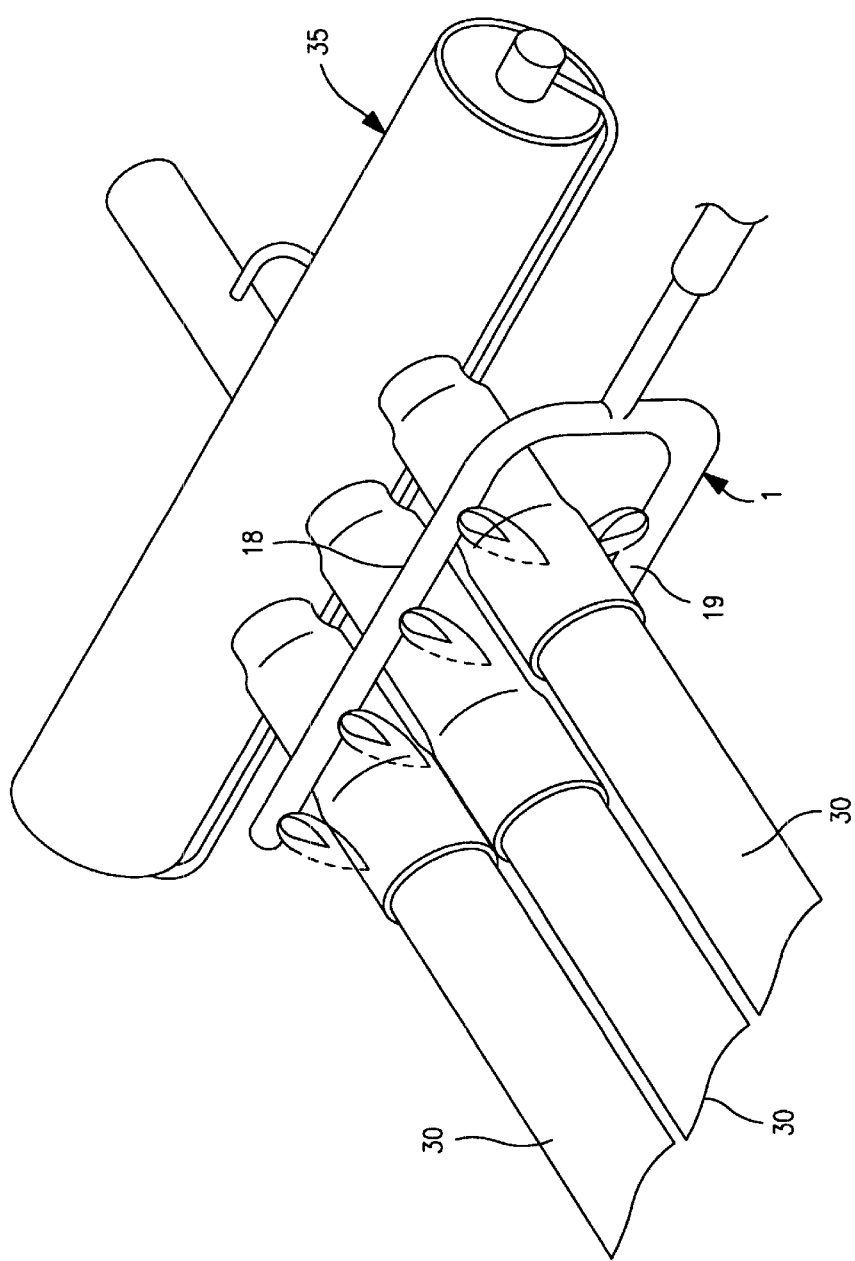
FIG. 4 is a perspective view of the torch tip of the present invention shown in operation.

Turning now to FIG. 4, the torch of the present invention is shown in use to remove a plurality of pipes 30 from a reversing valve 35. The torch head 16 is positioned with respect to the pipes 30 such that each of the pipes is heated simultaneously by the plurality of flame jets projecting from the orifices 25 of each leg 18, 19. Upon liquefying of the solder holding the pipes to the reversing valve 35, the pipes can be simultaneously removed. Similarly; a plurality of pipes can be simultaneously attached to the reversing valve.

What is claimed is:

1. A method of simultaneously attaching or removing a plurality of pipes to an object, comprising:

providing a torch tip comprising a stem having an inlet end, and a tip head in fluid communication with said stem spaced from said inlet end, said tip head comprising a pair of substantially parallel legs defining a space therebetween, each leg having a plurality of spaced orifices for emitting a flame;

positioning said torch tip such that said plurality of pipes is within said space between said legs; and causing flames to emit from said plurality of orifices to simultaneously heat said plurality of pipes.

2. The method of claim 1, wherein said plurality of pipes are attached or are to be attached with solder, and wherein heating said pipes liquifies said solder.

3. The method of claim 1, wherein said tip head has a bisecting plane, and wherein the centers of said orifices are each located at an angle of from about 30 to about 60° to said bisecting plane.

4. The method of claim 1, wherein said plurality of orifices on each leg are equally spaced.

5. The method of claim 1, wherein each of said orifices is formed in a portion of said leg that is reduced in curvature relative to a circular cross-section.

6. The method of claim 5, wherein said portion that is reduced in curvature is planar.

* * * * *